US012634417B2

(12) United States Patent
Zhang et al.

(10) Patent No.: US 12,634,417 B2
(45) Date of Patent: May 19, 2026

(54) MULTICOLOR LIGHT MIXING MODULE

(71) Applicant: QISDA CORPORATION, Taoyuan City (TW)

(72) Inventors: Jia-Ming Zhang, Taichung City (TW); Chih-Shiung Chien, Taoyuan City (TW); Ching-Tze Huang, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 357 days.

(21) Appl. No.: 18/211,298

(22) Filed: Jun. 19, 2023

(65) Prior Publication Data

US 2024/0073381 A1    Feb. 29, 2024

(30) Foreign Application Priority Data

Aug. 23, 2022    (CN) .......................... 202211011598.5

(51) Int. Cl.
*H04N 9/31*            (2006.01)
(52) U.S. Cl.
CPC ........... *H04N 9/317* (2013.01); *H04N 9/3155* (2013.01); *H04N 9/3158* (2013.01); *H04N 9/3161* (2013.01)
(58) Field of Classification Search
CPC .... H04N 9/317; H04N 9/3155; H04N 9/3158; H04N 9/3161; G02B 27/1006
USPC ........................................................ 353/101
See application file for complete search history.

(56) References Cited

U.S. PATENT DOCUMENTS

2021/0286248 A1*  9/2021  Lin ..................... G02B 27/1006
2024/0069421 A1    2/2024  Zhang

FOREIGN PATENT DOCUMENTS

CN         106462042 B  *  8/2018  ............ F21V 29/673

OTHER PUBLICATIONS

Translation of CN 106462042 (Year: 2025).*

* cited by examiner

*Primary Examiner* — Jerry L Brooks

(57)            ABSTRACT

A multicolor light mixing module includes a light-dividing unit, a light-homogenizing member, a first laser set including first and second lighting units in a sequential arrangement, a light-mixing unit obliquely opposite to the light-dividing unit for guiding a first color light of the first lighting unit and a second color light of the second lighting unit along first and second light-mixing axes to form first and second laser beams, and a condensing lens. The light-dividing unit is obliquely opposite to the first laser set to allow partial transmission and partial reflection of the first and second color lights, for guiding the first and second color lights along first and second light-dividing axes. The light-homogenizing member is disposed on the first and second light-mixing axes for homogenizing the first and second laser beams. The condensing lens between the light-homogenizing member and the light-mixing unit condenses the first and second laser beams.

17 Claims, 4 Drawing Sheets

FIG. 1

MULTICOLOR LIGHT MIXING MODULE

BACKGROUND OF THE INVENTION

1. Field of the Invention

The present invention relates to a multicolor light mixing module, and more specifically, to a multicolor light mixing module utilizing a light-dividing unit to divide a first color light and a second color light and utilizing a light-mixing unit to mix the first color light and the second color light.

2. Description of the Prior Art

In general, a conventional laser projection apparatus adopts a light mixing module to provide a multicolor laser beam for subsequent image projection. In the practical application, for further reducing an overall volume of a laser source of the laser projection apparatus, the common design involves packaging red, green, and blue laser diodes in a side-by-side arrangement into one multicolor laser source module, so as to simultaneously provide red, green and blue color lights to the light mixing module of the laser projection apparatus.

However, since the aforesaid packaging design only arranges the red, green, and blue laser diodes in multiple rows sequentially (e.g., arranging a plurality of red laser diodes in a row and arranging a plurality of green and blue laser diodes in another row), it may cause an uneven color distribution problem on an image projected by the laser projection apparatus (e.g., the image having a greenish upper portion and a bluish lower portion), so as to reduce the image projection quality of the laser projection apparatus.

SUMMARY OF THE INVENTION

The present invention provides a multicolor light mixing module suitable for providing a multicolor laser beam to a laser projection apparatus. The multicolor light mixing module includes a first laser set, a light-dividing unit, a light-mixing unit, a light-homogenizing member, and a condensing lens. The first laser set includes a plurality of first lighting units and a plurality of second lighting units in a sequential arrangement. The plurality of first lighting units emits a first color light. The plurality of second lighting unit emits a second color light. The light-dividing unit is obliquely disposed opposite to the first laser set to allow partial transmission and partial reflection of the first color light and the second color light, for guiding the first color light to travel along a first light-dividing axis and a second light-dividing axis respectively and guiding the second color light to travel along the first light-dividing axis and the second light-dividing axis respectively. The light-mixing unit is obliquely disposed opposite to the light-dividing unit for mixing the first color light and the second color light to form a first laser beam along a first light-mixing axis and form a second laser beam along a second light-mixing axis. The light-homogenizing member is disposed on the first light-mixing axis and the second light-mixing axis for homogenizing the first laser beam and the second laser beam. The condensing lens is disposed on the first light-mixing axis and the second light-mixing axis and located between the light-homogenizing member and the light-mixing unit, for condensing the first laser beam and the second laser beam.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a top view of a multicolor light mixing module according to an embodiment of the present invention.

DETAILED DESCRIPTION

Figure 1:
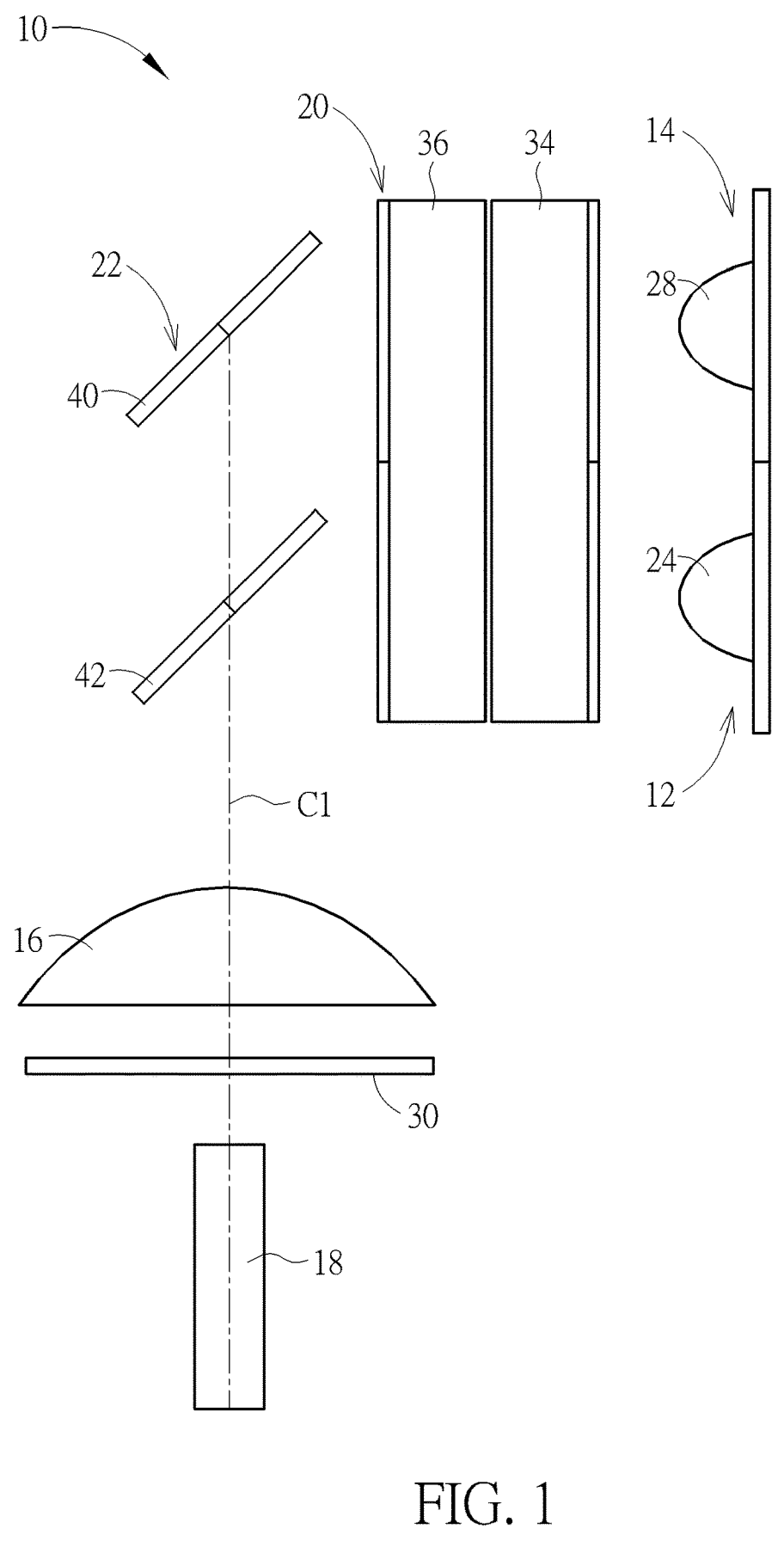
Figure 2:
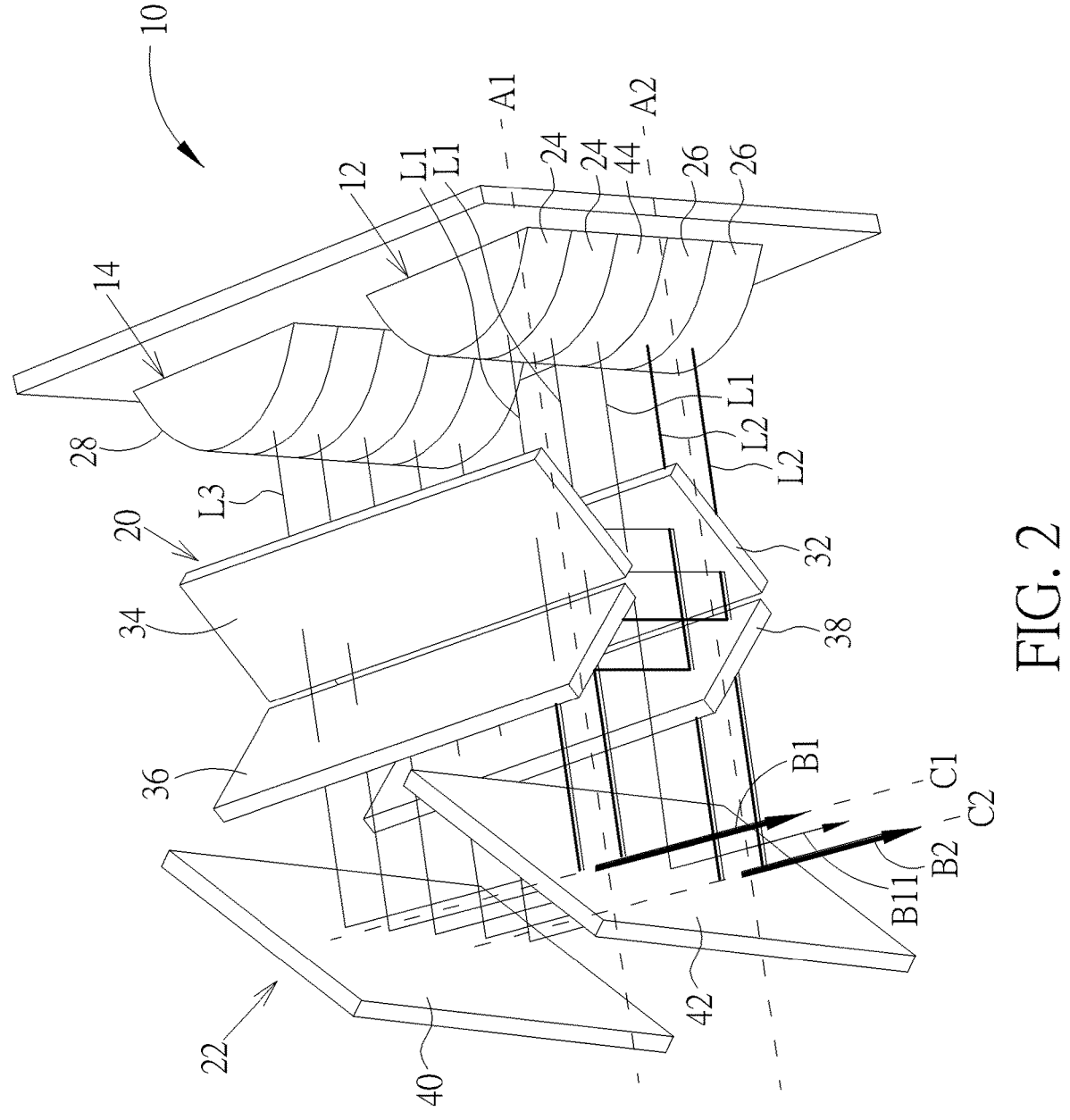
FIG. 2 is a diagram of the multicolor light mixing module in FIG. 1.

Please refer to FIG. 1 and FIG. 2. FIG. 1 is a top view of a multicolor light mixing module 10 according to an embodiment of the present invention. FIG. 2 is a diagram of the multicolor light mixing module 10 in FIG. 1. As shown in FIG. 1 and FIG. 2, the multicolor light mixing module 10 is suitable for providing a multicolor laser beam to a laser projection apparatus for subsequent image projection. The multicolor light mixing module 10 includes a first laser set 12, a second laser set 14, a condensing lens 16, a light-homogenizing member 18, a light-dividing unit 20 and a light-mixing unit 22. For more clearly showing the light path of the multicolor light mixing module 10, only the first laser set 12, the second laser set 14, the light-dividing unit 20 and the light-mixing unit 22 are depicted in FIG. 2 and the other optical components (e.g., the condensing lens 16 and the light-homogenizing member 18) of the multicolor light mixing module 10 are omitted herein.

The first laser set 12 includes a plurality of first lighting units 24 and a plurality of second lighting units 26 (preferably, the first lighting units 24 and the second lighting units 26 as shown in FIG. 2 are arranged sequentially from up to down along a gravity direction, but the present invention is not limited thereto). The second laser set 14 includes a plurality of third lighting units 28 (preferably, the third lighting units 28 as shown in FIG. 2 are arranged sequentially from up to down along the gravity direction, but the present invention is not limited thereto). The first lighting unit 24 could be preferably a green laser diode for emitting a first color light L1 (i.e., green light). The second lighting unit 26 could be preferably a blue laser diode for emitting a second color light L2 (i.e., blue light). The third lighting unit 28 could be preferably a red laser diode for emitting a third color light L3 (i.e., red light). The present invention is not limited to the aforesaid design, meaning that the color light configuration and the type of light source could be varied with the practical application of the multicolor light mixing module 10.

The condensing lens 16 is disposed on a first light-mixing axis C1 and a second light-mixing axis C2 and is located between the light-homogenizing member 18 and the light-mixing unit 22 for condensing a first laser beam B1 and a second laser beam B2 formed by the light-dividing unit 20 and the light-homogenizing unit 22. The light-homogenizing member 18 could be preferably a hollow light-homogenizing pipe (but not limited thereto, meaning that the present invention could adopt other light-homogenizing member commonly applied to a light mixing module, such as a solid light-homogenizing column). The light-homogenizing member 18 is disposed on the first light-mixing axis C1 and the light-mixing axis C2 to homogenize the first laser beam B1 and the second laser beam B2 transmitted from the condensing lens 16 for providing a multicolor laser beam to a laser projection apparatus for subsequent image projection. Moreover, in the practical application, the multicolor light mixing module 10 could further include a diffusing sheet 30. The diffusing sheet 30 is disposed between the light-homogenizing member 18 and the condensing lens 16 for receiving the condensed first and second laser beams B1, B2 and diffusing the first laser beam B1 and the second laser beam B2 to the light-homogenizing member 18 evenly. As for the related description for the condensing design of the condensing lens 16, the homogenizing design of the light-homogenizing member 18 and the diffusing design of the diffusing sheet 30, it could be commonly seen in the prior art and omitted herein.

More detailed description for the light-dividing unit 20 and the light-mixing unit 22 are provided as follows. The light-dividing unit 20 is obliquely disposed opposite to the first laser set 12 and the second laser set 14 for allowing partial transmission and partial reflection of the first color light L1 and the second color light L2 and allowing the third color light L3 to pass therethrough, so as to make the first color light L1 travel along a first light-dividing axis A1 and a second light-dividing axis A2 respectively and make the second color light L2 travel along the first light-dividing axis A1 and the second light-dividing axis A2 respectively. To be more specific, in this embodiment, as shown in FIG. 2, the light-dividing unit 20 could include a first dichroic sheet 32, the first transmissive and reflective sheet 34, the second dichroic sheet 36, and the second transmissive and reflective sheet 38. The first transmissive and reflective sheet 34 and the second dichroic sheet 36 are disposed on the first light-dividing axis A1 in a V-shaped arrangement (preferably, an oblique angle of the first transmissive and reflective sheet 34 relative to the first light-dividing axis A1 could be equal to 45° and an oblique angle of the second dichroic sheet 36 relative to the first light-dividing axis A1 could be equal to 135°, but not limited thereto). The second transmissive and reflective sheet 38 and the first dichroic sheet 32 are disposed on the second light-dividing axis A2 in a V-shaped arrangement (preferably, an oblique angle of the first dichroic sheet 32 relative to the second light-dividing axis A2 could be equal to 45° and an oblique angle of the second transmissive and reflective sheet 38 relative to the second light-dividing axis A2 could be equal to 135°, but not limited thereto).

The first dichroic sheet 32 is obliquely disposed on the second light-dividing axis A2 and opposite to the plurality of second lighting units 26 for reflecting the first color light L1, allowing the second color light L2 to pass therethrough and then travel along the second light-dividing axis A2, and allowing the third color light L3 to pass therethrough.

The first transmissive and reflective sheet 34 is obliquely disposed on the first light-dividing axis A1 and opposite to the plurality of first lighting units 24, for allowing the first color light L1 to pass therethrough partially (preferably at a ratio of 50%, but not limited thereto) and then travel along the first light-dividing axis A1 and reflecting the first color light L1 partially (preferably at a ratio of 50%, but not limited thereto) to the first dichroic sheet 32 to make the first color light L1 travel along the second light-dividing axis A2.

The second dichroic sheet 36 is obliquely disposed on the first light-dividing axis A1 and located between the first transmissive and reflective sheet 34 and the light-mixing unit 22, for reflecting the second color light L2 to the light-mixing unit 22, allowing the first color light L1 travelling along the first light-dividing axis A1 to pass therethrough to the light-mixing unit 22, and allowing the third color light L3 to pass therethrough to the light-mixing unit 22.

The second transmissive and reflective sheet 38 is obliquely disposed on the second light-dividing axis A2 and opposite to the second dichroic sheet 36, for allowing the second color light L2 travelling along the second light-dividing axis A2 to pass therethrough partially (preferably at a ratio of 50%, but not limited thereto) to the light-mixing unit 22, reflecting the second color light L2 partially (preferably at a ratio of 50%, but not limited thereto) to the second dichroic sheet 36 to make the second color light L2 travel along the first light-dividing axis A1, and allowing the third color light L3 to pass therethrough to the light-mixing unit 22.

Via the aforesaid light dividing design, the multicolor light mixing module 10 can utilize the light-dividing unit 20 to allow the third color light L3 to pass therethrough and guide the first color light L1 and the second color light L2 respectively emitted by the first lighting units 24 and the second lighting units 26 in a sequential arrangement to travel along different light-dividing axes (e.g., the first light-dividing axis A1 and the second light-dividing axis A2 as shown in FIG. 2), so as to provide color lights (i.e., the first color light L1, the second color light L2, and the third color light L3) for the light-mixing unit 22 to mix on the first light-mixing axis C1 and the second light-mixing axis C2.

As shown in FIG. 1 and FIG. 2, the light-mixing unit 22 is obliquely disposed opposite to the light-dividing unit 20 for mixing the first color light L1, the second color light L2 and the third color light L3 to form the first laser beam B1 along the first light-mixing axis C1 and form the second laser beam B2 along the second light-mixing axis C2.

To be more specific, in this embodiment, as shown in FIG. 2, the light-mixing unit 22 could include a reflecting sheet 40 and a third dichroic sheet 42. The reflecting sheet 40 is disposed on the first light-mixing axis C1 and the second light-mixing axis C2 and opposite to the plurality of third lighting units 28, for reflecting the third color light L3 to the third dichroic sheet 42 along the first light-mixing axis C1 and the second light-mixing axis C2. The third dichroic sheet 42 is disposed between the reflecting sheet 40 and the condensing lens 16 for allowing the third color light L3 to pass therethrough and reflecting the first color light L1 and the second color light L2 travelling along the first light-dividing axis A1 and the second light-dividing axis A2. Via the aforesaid design, the first color light L1, the second color light L2, and the third color light L3 can form the first laser beam B1 along the first light-mixing axis C1 and form the second laser beam B2 along the second light-mixing axis C2, so as to achieve the light-mixing effect for providing a multicolor laser beam to a laser projection apparatus for subsequent image projection. Furthermore, in the practical application, as shown in FIG. 2, the first laser set 12 could further include an intermediate lighting unit 44. The intermediate lighting unit 44 is disposed between the first lighting unit 24 and the second lighting unit 26. In this embodiment, the intermediate lighting unit 44 could be preferably a green laser diode to emit the first color light L1 (i.e., green light), but the present invention is not limited thereto. For example, in another embodiment, the present invention could adopt design that the intermediate lighting unit 44 is a blue laser diode to emit the second color light L2. In such a manner, the intermediate lighting unit 44 can be directly incident to the light-mixing unit 22 without passing through the light-dividing unit 20, so as to form a color enhancement beam Bll located between the first laser beam B1 and the second laser beam B2 for generating the color enhancement effect.

Via the design that the light-dividing unit 20 is utilized to divide the first color light L1 and the second color light L2 and allow the third color light L3 to pass therethrough and the light-mixing unit 22 is utilized to mix the first color light L1, the second color light L2 and the third color light L3, the present invention can still provide the laser beam with multicolor light distributed in proper proportions on every light-mixing axis even in the configuration that the red, green, and blue laser diodes are arranged in multiple rows sequentially (e.g., arranging a plurality of red laser diodes in a row and arranging a plurality of green and blue laser diodes in another row) aforementioned in the prior art. In such a manner, the present invention can efficiently solve the uneven color distribution problem on the image projected by the laser projection apparatus (e.g., the image having a greenish upper portion and a bluish lower portion) aforementioned in the prior art, so as to greatly improve the image projection quality and color uniformity of the laser projection apparatus.

Figure 3:
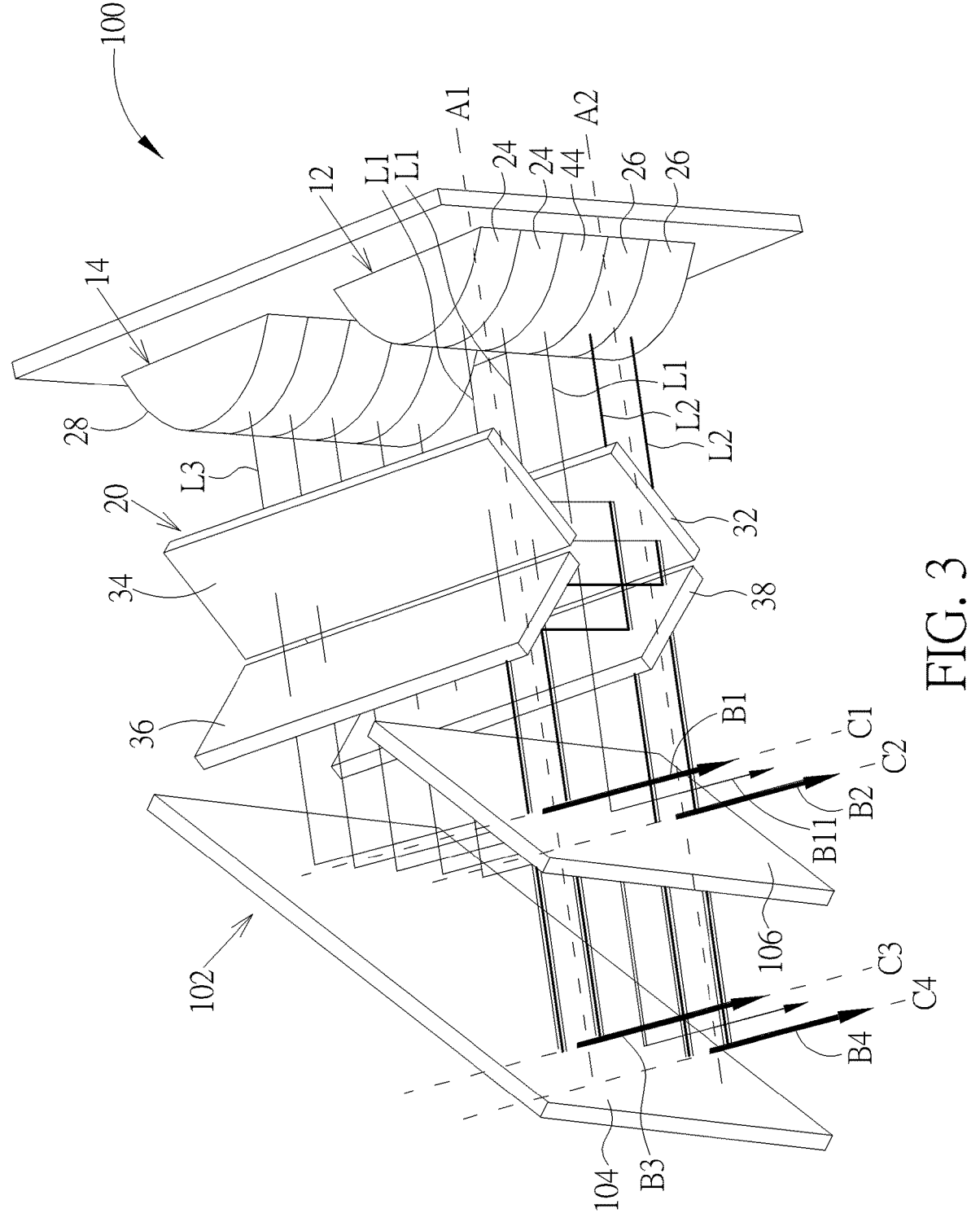
FIG. 3 is a diagram of a multicolor light mixing module according to another embodiment of the present invention.

It should be mentioned that the light mixing design adopted by the multicolor light mixing module of the present invention is not limited to the aforesaid embodiments. For example, please refer to FIG. 3, which is a diagram of a multicolor light mixing module 100 according to another embodiment of the present invention. Components both mentioned in this embodiment and the aforesaid embodiments represent components with similar structures or functions, and the related description could be reasoned by analogy according to the aforesaid embodiments and omitted herein. In this embodiment, the multicolor light mixing module 100 could include the first laser set 12, the second laser set 14, the condensing lens 16, the light-homogenizing member 18, the light-dividing unit 20 and a light-mixing unit 102. As shown in FIG. 3, the light-mixing unit 102 could include a reflecting sheet 104 and a third transmissive and reflective sheet 106. For more clearly showing the light path of the multicolor light mixing module 100, only the first laser set 12, the second laser set 14, the light-dividing unit 20 and the light-mixing unit 102 are depicted in FIG. 3 and the other optical components (e.g., the condensing lens 16, the light-homogenizing member 18 and the diffusing sheet 30) of the multicolor light mixing module 100 are omitted herein.

As shown in FIG. 3, the reflecting sheet 104 is disposed on the first light-mixing axis C1 and the second light-mixing C2, and a projection of the reflecting sheet 104 relative to the first laser set 12 and the second laser set 14 could cover the first laser set 12 and the second laser set 14 completely. The third transmissive and reflective sheet 106 is disposed on the first light-mixing axis C1 and the second light-mixing axis C2 and is located between the reflecting sheet 104 and the condensing lens 16.

In this configuration, the reflecting sheet 104 can reflect the third color light L3 to the third transmissive and reflective sheet 106 along the first light-mixing axis C1 and the second light-mixing axis C2, and the third transmissive and reflective sheet 106 can allow the third color light L3 to pass therethrough partially (preferably at a ratio of 50%, but not limited thereto) and can reflect the first color light L1 and the second color light L2 travelling along the first light-dividing axis A1 and the second light-dividing axis A2 partially (preferably at a ratio of 50%, but not limited thereto), so as to make the first color light L1, the second color light L2 and the third color light L3 form the first laser beam B1 along the first light-mixing axis C1 and form the second laser beam B2 along the second light-mixing axis C2.

At the same time, the third transmissive and reflective sheet 106 can also reflect the third color light L3 partially (preferably at a ratio of 50%, but not limited thereto) to the reflecting sheet 104 to make the third color light L3 travel along a third light-mixing axis C3 and a fourth light-mixing axis C4, and the third transmissive and reflective sheet 106 can allow the first color light L1 and the second color light L2 travelling along the first-dividing axis A1 and the second light-dividing axis A2 to pass therethrough partially (preferably at a ratio of 50%, but not limited thereto) to the reflecting sheet 104, so as to make the first color light L1, the second color light L2 and the third color light L3 form a laser beam B3 along the third light-mixing axis C3 and form a fourth laser beam B4 along the fourth light-mixing axis C4.

In such a manner, the multicolor light mixing module 100 of the present invention can utilize the reflecting sheet 104 and the third transmissive and reflective sheet 106 to generate the light mixing effect that the color lights emitted by the first laser set 12 and the second laser set 14 can be mixed to form four multicolor laser beams for subsequent image projection of a laser projection apparatus.

Moreover, the light source configuration adopted by the multicolor light mixing module of the present invention is not limited to the aforesaid embodiments. For example, please refer to FIG. 4, which is a diagram of a multicolor light mixing module 200 according to another embodiment of the present invention. Components both mentioned in this embodiment and the aforesaid embodiments represent components with similar structures or functions, and the related description could be reasoned by analogy according to the aforesaid embodiments and omitted herein. In this embodiment, the multicolor light mixing module 200 could include a first laser set 202, a second laser set 204, the condensing lens 16, the light-homogenizing member 18, a light-dividing unit 206 and a light-mixing unit 208. For more clearly showing the light path of the multicolor light mixing module 200, only the first laser set 202, the second laser set 204, the light-dividing unit 206 and the light-mixing unit 208 are depicted in FIG. 4 and the other optical components (e.g., the condensing lens 16, the light-homogenizing member 18 and the diffusing sheet 30) of the multicolor light mixing module 200 are omitted herein.

Figure 4:
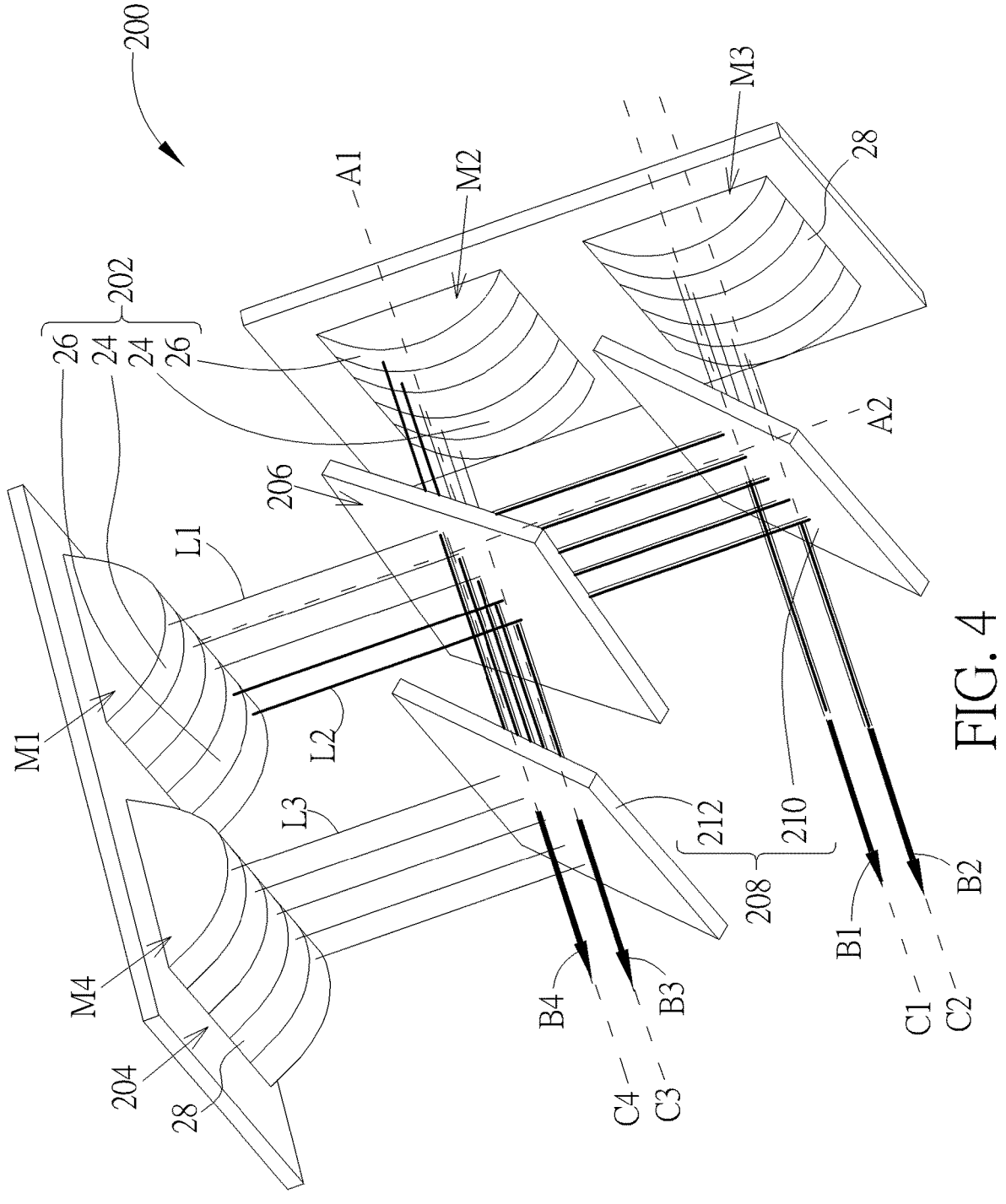
FIG. 4 is a diagram of a multicolor light mixing module according to another embodiment of the present invention.

As shown in FIG. 4, the first laser set 202 includes the plurality first lighting units 24 and the plurality of second lighting units 26, the second laser set 204 includes the plurality of third lighting units 28, the light-dividing unit 206 could be a transmissive and reflective sheet, and the light-mixing unit 208 includes a first dichroic sheet 210 and a second dichroic sheet 212. In this embodiment, a portion of the first light units 24 and a portion of the second lighting units 26 are arranged sequentially from up to down to form a first lighting matrix M1, and remaining second lighting units 26 and remaining first lighting units 24 could be preferably arranged sequentially from up to down along a gravity direction to form a second lighting matrix M2. A portion of the third lighting units 28 is located at a side of the second lighting matrix M2 and is opposite to the first dichroic sheet 210 to form a third lighting matrix M3, and remaining third lighting units 28 are located at a side of the first lighting matrix M1 and is opposite to the second dichroic sheet 212 to form a fourth lighting matrix M4. The light-dividing unit 206 is disposed on the first light-dividing axis A1 and is opposite to the first lighting matrix M1 and the second lighting matrix M2. The first dichroic sheet 210 is disposed on the second light-dividing axis A2, and the second dichroic sheet 212 is disposed on the first light-dividing axis A1, wherein oblique angles of the light-dividing unit 206 and the second dichroic sheet 212 relative to the first light-dividing axis A1 could be preferably equal to 45° and an oblique angle of the first dichroic sheet 210 relative to the second light-dividing axis A2 could be preferably equal to 45°, but the present invention is not limited thereto.

Via the aforesaid design, as shown in FIG. 4, the light-dividing unit 206 can allow partial transmission and partial reflection (at a ratio of 50% respectively, but not limited thereto) of the first color light L1 and the second color light L2, to make the first color light L1 travel along the first light-dividing axis A1 and second light-dividing axis A2 respectively and make the second color light L2 travel along the first light-dividing axis A1 and second light-dividing axis A2 respectively. As such, the light-dividing unit 206 can provide color lights (i.e., the first color light L1 and the second color light L2) for the light-mixing unit 208 to mix on the first light-mixing axis C1, the second light-mixing axis C2, the third light-mixing axis C3, and the fourth light-mixing axis C4.

After the aforesaid light dividing process is completed, the first dichroic sheet 210 can reflect the first color light L1 and the second color light L2 travelling along the second light-dividing axis A2 and allow the third color light L3 to pass therethrough, so as to make the first color light L1, the second color light L2 and the third color light L3 form the first laser beam B1 along the first light-mixing axis C1 and form the second laser beam B2 along the second light-mixing axis C2. During the aforesaid process, the second dichroic sheet 212 can reflect the third color light L3 and allow the first color light L1 and the second color light L2 travelling along the first light-dividing axis A1 to pass therethrough, so as to make the first color light L1, the second color light L2 and the third color light L3 form the third laser beam B3 along the third light-mixing axis C3 and form the fourth laser beam B4 along the fourth light-mixing axis C4.

In such a manner, the multicolor light mixing module 200 of the present invention can utilize the light dividing unit 206 to divide the first color light L1 and the second color light L2 and utilize the light-mixing unit 208 to mix the first color light L1, the second color light L2 and the third color light L3, so as to generate the light mixing effect that the color lights emitted by the first laser set 202 and the second laser set 204 can be mixed to form four multicolor laser beams for subsequent image projection of a laser projection apparatus.

To be noted, the second laser set mentioned in the aforesaid embodiments could be an omissible optical component. In brief, in another embodiment that the second laser set is omitted, the multicolor light mixing module of the present invention can utilize the light-dividing unit to divide the first color light and the second color light and utilize the light-mixing unit to mix the first color light and the second color light, so as to provide the laser beam with multicolor light (e.g., blue and green lights) distributed in proper proportions on every light-mixing axis. As for the other related description for this embodiment, it could be reasoned by analogy according to the aforesaid embodiments and omitted.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A multicolor light mixing module suitable for providing a multicolor laser beam to a laser projection apparatus, the multicolor light mixing module comprising:

a first laser set comprising a plurality of first lighting units and a plurality of second lighting units in a sequential arrangement, the plurality of first lighting units emitting a first color light, the plurality of second lighting unit emitting a second color light;

a light-dividing unit obliquely disposed opposite to the first laser set to allow partial transmission and partial reflection of the first color light and the second color light, for guiding the first color light to travel along a first light-dividing axis and a second light-dividing axis respectively and guiding the second color light to travel along the first light-dividing axis and the second light-dividing axis respectively, wherein the light-dividing unit comprises a first dichroic sheet, a first transmissive and reflective sheet, a second transmissive and reflective sheet and a second dichroic sheet; the first dichroic sheet is obliquely disposed on the second light-dividing axis and opposite to the plurality of second lighting units; the first transmissive and reflective sheet is obliquely disposed on the first light-dividing axis and opposite to the plurality of first lighting units; the second dichroic sheet is obliquely disposed on the first light-dividing axis and located between the first transmissive and reflective sheet and the light-mixing unit; the second transmissive and reflective sheet is obliquely disposed on the second light-dividing axis and opposite to the second dichroic sheet;

a light-mixing unit obliquely disposed opposite to the light-dividing unit for mixing the first color light and the second color light to form a first laser beam along a first light-mixing axis and form a second laser beam along a second light-mixing axis;

a light-homogenizing member disposed on the first light-mixing axis and the second light-mixing axis for homogenizing the first laser beam and the second laser beam; and a condensing lens disposed on the first light-mixing axis and the second light-mixing axis and located between the light-homogenizing member and the light-mixing unit, for condensing the first laser beam and the second laser beam;

wherein the first dichroic sheet reflects the first color light and allows the second color light to pass therethrough and then travel along the second light-dividing axis; the first transmissive and reflective sheet allows the first color light to pass therethrough partially and then travel along the first light-dividing axis and partially reflects the first color light to the first dichroic sheet to make the first color light travel along the second light-dividing axis; the second dichroic sheet reflects the second color light to the light-mixing unit and allows the first color light travelling along the first light-dividing axis to pass therethrough to the light-mixing unit; the second transmissive and reflective sheet allows partial transmission of the second color light travelling along the second light-dividing axis to the light-mixing unit, partially reflects the second color light to the second dichroic sheet to make the second color light travel along the first light-dividing axis, and allows the first color light travelling along the second light-dividing axis to pass therethrough to the light-mixing unit.

2. The multicolor light mixing module of claim 1, wherein the first transmissive and reflective sheet and the second dichroic sheet are disposed in a V-shaped arrangement on the first light-mixing axis, and the first dichroic sheet and the second transmissive and reflective sheet are disposed in a V-shaped arrangement on the second light-mixing axis.

3. The multicolor light mixing module of claim 2, wherein an oblique angle of the first transmissive and reflective sheet relative to the first light-mixing axis is equal to 45°, an oblique angle of the second dichroic sheet relative to the first light-mixing axis is equal to 135°, an oblique angle of the first dichroic sheet relative to the second light-mixing axis is equal to 45°, and an oblique angle of the second transmissive and reflective sheet relative to the second light-mixing axis is equal to 135°.

4. The multicolor light mixing module of claim 1, wherein the first transmissive and reflective sheet allows the first color light to pass therethrough at a ratio of 50% and then travel along the first light-dividing axis, and the first transmissive and reflective sheet reflects the first color light partially to the first dichroic sheet at a ratio of 50% to make the first color light travel along the second light-dividing axis.

5. The multicolor light mixing module of claim 1, wherein the multicolor light mixing module further comprises a second laser set, the light-mixing unit comprises a reflecting sheet and a third dichroic sheet;

the second laser set is opposite to the first dichroic sheet and the first transmissive and reflective sheet and comprises a plurality of third lighting units in a sequential arrangement, the plurality of third lighting units emits a third color light, and the first dichroic sheet, the first transmissive and reflective sheet, the second transmissive and reflective sheet, and the second dichroic sheet allow the third color light to pass therethrough;

the reflecting sheet is disposed on the first light-mixing axis and the second light-mixing axis and is opposite to the plurality of third lighting units, for reflecting the third color light to the third dichroic sheet along the first light-mixing axis and the second light-mixing axis;

the third dichroic sheet is disposed between the reflecting sheet and the condensing lens, for allowing the third color light to pass therethrough and reflecting the first color light and the second color light travelling along the first light-dividing axis and the second light-dividing axis, so as to make the first color light, the second color light and the third color light form the first laser beam along the first light-mixing axis and form the second laser beam along the second light-mixing axis.

6. The multicolor light mixing module of claim 5, wherein the first color light is a green light, the second color light is a blue light, and the third color light is a red light.

7. The multicolor light mixing module of claim 1, wherein the multicolor light mixing module further comprises a second laser set, the light-mixing unit comprises a reflecting sheet and a third transmissive and reflective sheet;

the second laser set is opposite to the first dichroic sheet and the first transmissive and reflective sheet and comprises a plurality of third lighting units in a sequential arrangement, the plurality of third lighting units emits a third color light, and the first dichroic sheet, the first transmissive and reflective sheet, the second transmissive and reflective sheet, and the second dichroic sheet allow the third color light to pass therethrough;

the reflecting sheet is disposed on the first light-mixing axis and the second light-mixing axis, a projection of the reflecting sheet covers the first laser set and the second laser set for reflecting the third color light to the third transmissive and reflective sheet along the first light-mixing axis and the second light-mixing axis;

the third transmissive and reflective sheet is disposed on the first light-mixing axis and the second light-mixing axis and located between the reflecting sheet and the condensing lens, for allowing the third color light to pass therethrough partially and partially reflecting the first color light and the second color light travelling along the first-dividing axis and the second light-dividing axis, so as to make the first color light, the second color light, and the third color light form the first laser beam along the first light-mixing axis and form the second laser beam along the second light-mixing axis;

the third transmissive and reflective sheet further reflects the third color light partially to the reflecting sheet to make the third color light travel along a third light-mixing axis and a fourth light-mixing axis, and allows partial transmission of the first color light and the second color light travelling along the first light-dividing axis and the second light-dividing axis to the reflecting sheet, so as to make the first color light, the second color light and the third color light form a third laser beam along the third light-mixing axis and form a fourth laser beam along the fourth light-mixing axis;

wherein the condensing lens condenses the first laser beam, the second laser beam, the third laser beam and the fourth laser beam, and the light-homogenizing member homogenizes the first laser beam, the second laser beam, the third laser beam and the fourth laser beam.

8. The multicolor light mixing module of claim 7, wherein the first color light is a green light, the second color light is a blue light, and the third color light is a red light.

9. The multicolor light mixing module of claim 2, wherein the first laser set further comprises an intermediate lighting unit, the intermediate lighting unit is disposed between the first lighting unit and the second lighting unit, and the intermediate lighting unit emits the first color light or the second color light to be directly incident to the light-mixing unit without passing through the light-dividing unit, so as to form a color enhancement beam located between the first laser beam and the second laser beam.

10. The multicolor light mixing module of claim 1, wherein the light-homogenizing member is a hollow homogenizing pipe or a solid homogenizing column.

11. The multicolor light mixing module of claim 1 further comprising:

a diffusing sheet disposed between the light-homogenizing member and the condensing lens for diffusing the first laser beam.

12. A multicolor light mixing module suitable for providing a multicolor laser beam to a laser projection apparatus, the multicolor light mixing module comprising:

a first laser set comprising a plurality of first lighting units and a plurality of second lighting units in a sequential arrangement, the plurality of first lighting units emitting a first color light, the plurality of second lighting unit emitting a second color light, wherein a portion of the first lighting units and a portion of the second lighting units are arranged sequentially to form a first lighting matrix, and remaining second lighting units and remaining first lighting units are arranged sequentially to form a second lighting matrix;

a light-dividing unit obliquely disposed opposite to the first laser set to allow partial transmission and partial reflection of the first color light and the second color light, for guiding the first color light to travel along a first light-dividing axis and a second light-dividing axis respectively and guiding the second color light to travel along the first light-dividing axis and the second light-dividing axis respectively, wherein the light-dividing unit comprises a transmissive and reflective sheet, and the transmissive and the reflective sheet is disposed on the first light-dividing unit and is opposite to the first lighting matrix and the second lighting matrix, for allowing partial transmission and partial reflection of the first color light and the second color light, so as to make the first color light travel along the first light-dividing axis and the second light-dividing axis respectively and make the second color light travel along the first light-dividing axis and the second light-dividing axis respectively;

a light-mixing unit obliquely disposed opposite to the light-dividing unit for mixing the first color light and the second color light to form a first laser beam along a first light-mixing axis and form a second laser beam along a second light-mixing axis;

a light-homogenizing member disposed on the first light-mixing axis and the second light-mixing axis for homogenizing the first laser beam and the second laser beam; and a condensing lens disposed on the first light-mixing axis and the second light-mixing axis and located between the light-homogenizing member and the light-mixing unit, for condensing the first laser beam and the second laser beam.

13. The multicolor light mixing module of claim 12, wherein the transmissive and the reflective sheet allows the first color light and the second color light to pass therethrough at a ratio of 50% and reflects the first color light and the second color light at a ratio of 50%.

14. The multicolor light mixing module of claim 12, wherein the multicolor light mixing module further comprises a second laser set, the light-mixing unit comprises a first dichroic sheet and a second dichroic sheet; the second laser set comprises a plurality of third lighting units in a sequential arrangement, a portion of the third lighting units is located at side of the second lighting matrix and opposite to the first dichroic sheet to form a third lighting matrix, remaining third lighting units are located a side of the first lighting matrix and opposite to the second dichroic sheet to form a fourth lighting matrix, and the plurality of third lighting units emits a third color light;

the first dichroic sheet is disposed on the second light-dividing axis for reflecting the first color light and the second color light travelling along the second light-dividing axis and allowing the third color light to pass therethrough, so as to make the first color light, the second color light and the third color light form the first laser beam along the first light-mixing axis and form the second laser beam along the second light-mixing axis;

the second dichroic sheet is disposed on the first light-dividing axis for reflecting the third color light and allowing the first color light and the second color light travelling along the first light-dividing axis to pass therethrough, so as to make the first color light, the second color light and the third color light form a third laser beam along a third light-mixing axis and form a fourth laser beam along a fourth light-mixing axis;

wherein the condensing lens condenses the first laser beam, the second laser beam, the third laser beam and the fourth laser beam, and the light-homogenizing member homogenizes the first laser beam, the second laser beam, the third laser beam and the fourth laser beam.

15. The multicolor light mixing module of claim 14, wherein the first color light is a green light, the second color light is a blue light, and the third color light is a red light.

16. The multicolor light mixing module of claim 12, wherein the light-homogenizing member is a hollow homogenizing pipe or a solid homogenizing column.

17. The multicolor light mixing module of claim 12 further comprising:

a diffusing sheet disposed between the light-homogenizing member and the condensing lens for diffusing the first laser beam.

* * * * *